(12) United States Patent
Doglioni Majer

(10) Patent No.: US 11,292,663 B2
(45) Date of Patent: Apr. 5, 2022

(54) BEVERAGE CAPSULE AND METHOD

(71) Applicant: TUTTOESPRESSO S.R.L., Milan (IT)

(72) Inventor: Luca Doglioni Majer, Milan (IT)

(73) Assignee: TUTTOESPRESSO S.R.L., Milan (IT)

( * ) Notice: Subject to any disclaimer, the term of this patent is extended or adjusted under 35 U.S.C. 154(b) by 0 days.

(21) Appl. No.: 16/628,444

(22) PCT Filed: Jul. 5, 2017

(86) PCT No.: PCT/EP2017/066840
§ 371 (c)(1),
(2) Date: Jan. 3, 2020

(87) PCT Pub. No.: WO2018/224174
PCT Pub. Date: Dec. 13, 2018

(65) Prior Publication Data
US 2020/0223621 A1    Jul. 16, 2020

(51) Int. Cl.
| B65D 85/80 | (2006.01) |
| B65D 85/804 | (2006.01) |
| A23F 5/26 | (2006.01) |
| A47J 31/40 | (2006.01) |

(52) U.S. Cl.
CPC .......... *B65D 85/8052* (2020.05); *A23F 5/262* (2013.01); *A47J 31/407* (2013.01); *B65D 85/8043* (2013.01)

(58) Field of Classification Search
CPC .............. B65D 85/8043; B65D 85/804; B65D 85/8046; A23F 5/262
See application file for complete search history.

(56) References Cited

U.S. PATENT DOCUMENTS

| 2004/0228955 A1* | 11/2004 | Denisart | B65D 85/8046 |
| | | | 426/590 |
| 2008/0026121 A1* | 1/2008 | Mastropasqua | B65D 85/8043 |
| | | | 426/433 |
| 2009/0175986 A1* | 7/2009 | Doglioni Majer | B65D 85/8043 |
| | | | 426/77 |

FOREIGN PATENT DOCUMENTS

| CN | 1507332 | 6/2004 |
| CN | 1910090 | 2/2007 |
| CN | 104768857 | 7/2015 |
| CN | 110997523 A | 4/2020 |
| EP | 1892199 A1 * | 2/2008 ......... B65D 85/8043 |
| EP | 1892199 | 12/2009 |
| JP | 3150198 | 3/2001 |
| PT | 1892199 | 2/2008 |
| WO | 2004073469 | 9/2004 |
| WO | 2008011913 | 1/2008 |
| WO | 2010041179 | 4/2010 |
| WO | 2015189317 | 12/2015 |

OTHER PUBLICATIONS

Formal Human Translation of Ternite EP 1892199. Published 2008. (Year: 2008).*

(Continued)

*Primary Examiner* — Ericson M Lachica
(74) *Attorney, Agent, or Firm* — Silvia Salvadori

(57) ABSTRACT

A capsule has an outlet wall (4) that comprises an opening (5) and a closing member (6) for the opening; the closing member is integral with the outlet wall of the capsule and extends from the inner side of the outlet wall, inside the capsule.

8 Claims, 5 Drawing Sheets

(56) References Cited

OTHER PUBLICATIONS

International Search Report and written opinion issued by the EPO dated Feb. 27, 2018 for PCT/EP2017/066840.
Office Action issued by the CN Patent Offic dated Mar. 8, 2021 for corresponding CN patent application No. 201780092946.7.

* cited by examiner

BEVERAGE CAPSULE AND METHOD

FIELD OF THE INVENTION

The present invention relates to a capsule for beverages and to a method of preparing a beverage with said capsule; in particular, the invention relates to a capsule for preparing and dispensing beverages, in which the outflow of the beverage from the capsule is controlled. In the following, the wording capsule will be used, this wording encompasses similar definitions such as, e.g., cartridge and pod.

The capsule of the present invention may be provided with a conveyor attached to the bottom wall, i.e. the outlet wall, of the capsule, the conveyor having a plunger to provide an opening in said outlet wall when a beverage is to be prepared.

BACKGROUND OF THE INVENTION

The use of capsules for beverages has become widespread in the field, not only for coffee, chocolate and similar beverages but also for the preparation of other beverages such as broth, as e.g. disclosed in WO2015193774. The advantage of packaging a base product (such as a ground or soluble product) in a capsule for beverage preparation is well known: the product is put into a capsule in its best condition, with the maximum of its flavor and aroma being trapped in the capsule or capsule container.

EP1604915 discloses a capsule having a conveyor that collects the beverage exiting the capsule and that delivers the beverage from a central outlet. This solution may reduce the cross-contamination in the beverage preparing machine. This capsule has a foil or membrane that defines the brewing chamber; the membrane is pierced when the membrane contacts a plurality of piercing elements within the capsule.

WO2008011913 shows a capsule utilizing a cap defining a delivery chamber which conveys the beverage exiting the capsule towards the user's receptacle (such as a mug, jug, cup or glass) and actually replaces the outlet means present in known drink dispensing apparatus. The capsule has a central output port for the outflow of the extracted beverage, the output port is closed by an elastic septum which opens under the pressure of the water.

EP2628694, in the name of the Applicant, discloses a capsule provided with outlet means which are portions of the bottom wall defined by grooves and which comprise portions extending towards the outside of the cartridge. In other words, the bottom wall of the capsule has grooves that define portions of the bottom wall that act as an outlet when the wall is broken; additionally, the outlet portions of the bottom wall which are defined by the grooves are also extending externally to provide projecting, wedge-shaped, portions of the wall.

PCT/EP2016/057844, in the name of the present applicant and not published at the date of filing of the present application, discloses a self-opening capsule that includes a brewing chamber and a collector element, i.e. a conveyor cap, for the beverage exiting the brewing chamber. In PCT'844, embodiments of capsule have a brewing chamber including outlet openings in the bottom wall; the outlet openings may be obtained according to above discussed EP2628694 and include grooves defining a portion of the wall having projecting parts. The collector element, or conveyor cap, is mounted on the brewing chamber outside the outlet wall of the chamber and is movable from a position spaced from said outlet wall to a position in which the conveyor cap is substantially adjacent to the wall and presses the projecting parts inside the brewing chamber to open the capsule and dispense a beverage.

EP17150074 in the name of the applicant and not published at the filing date of this application, discloses a capsule having in one embodiment a bottom wall provided with projecting portions which extends from the outer surface of the outlet wall. The projecting portions are linked to the outlet wall by means of a connecting element that links the outer surface of the wall with an inner face of the projecting portion along at least part of the periphery of said inner face.

EP1370170 discloses a unit for the preparation of a beverage from a soluble product contained in a capsule, comprising a collecting device with a seat designed to contain the cartridge. When the outlet wall of the capsule is opened by a piercing means of the seat, the piercing means engages the outlet wall to provide at least one throttling arrangement is provided between piercing means and outlet wall of the cartridge.

A problem with known capsules to be used with different ingredients is concerning the outlet means for the flow of the beverage from the brewing chamber. The outlet means should be able to provide different flow rates in view of the nature of the ingredient in the capsule and at the same time they should provide the best possible sealing of the capsule and a reliable way of opening the capsule.

A related problem, especially with those capsules containing a ground or leaf product, is that of improving the brewing conditions so as to obtain the best possible beverage This is particularly important when coffee is required to have a silky-textured and persistent amount of froth (i.e. the bi-phasic section of a coffee beverage obtained through the use of pressure, floating on the surface of the beverage container, composed by small air bubbles entrapped in the liquid) or when it is required to provide a complete dissolution of the ingredients utilising ingredients such as water-soluble powders or syrups, or beverage concentrates such as condensed milk.

The known capsules also have a recycling problem in so far they have a combination of aluminum and plastics as disclosed e.g. in EP1604915.

Additionally, capsules containing different ingredients and designed for preparing different beverages (particularly in the case of very different and often un-compatible tastes, such as coffee, tea, herbal infusions, fruit-flavoured soluble cold drinks, or broth), should be suitable to be used with a machine for beverage preparation without generating cross-contamination within the machine's outlet path, in order to optimise the organoleptic in-cup quality of the beverage, particularly when changing from one type of beverage to another one.

Therefore, there is the need for an improved capsule that can solve the above mentioned problems and that can be used for preparing dispensing beverages in an easy, reliable, cost-effective way.

SUMMARY OF THE INVENTION

It is an aim of the present invention to solve the above mentioned problems and provide an improved beverage dispensing capsule that can give excellent beverage from one or more ingredients.

This aim is achieved by the present invention that provides a capsule for a beverage dispensing apparatus. The invention also provides a method of dispensing a beverage from a capsule.

Preferred embodiments are object of dependent claims.

A capsule according to the invention has an inlet wall through which a fluid can be fed into the capsule to prepare a beverage and an outlet wall including at least one beverage outlet means for dispensing the beverage from the capsule. The outlet wall has an outer side and an inner side. The capsule acts as a brewing chamber in a way known per se in the art. The beverage outlet means comprise at least one outlet portion and a closing member for said outlet portion to maintain the capsule normally close until a beverage is prepared. The closing member is located inside the capsule and is projecting from the inner side of the outlet wall, towards the inside the capsule. The closing member usually is integral to, i.e. in one piece with, the outlet wall through a connecting element that is a breakable portion of the capsule; in general, the breakable portion of the capsule is a portion having preferably reduced thickness with respect to the remaining part of the outlet wall.

In other words, the capsule has an outlet wall that comprises at least one outlet portion closed by closing member, e.g. an element which is extending from the outlet wall on and around the outlet portion, inwards the capsule and which is integral with the outlet wall of the capsule; the connecting element(s) between outlet wall and closing member can be broken, or ruptured, to open the capsule and dispense the beverage. The closing member can thus be detached at least in part from the outlet wall of the capsule and moved into the capsule.

The closing member has an outer face and an inner face, the inner face faces the interior of the capsule, where foodstuff may be stored; in an embodiment, when the capsule is closed, at least a part of said outer face of the projecting closing member is spaced by a distance from said outer side of said outlet wall to provide an outlet portion, i.e. an opening, in the outlet wall. In an opened condition of the capsule, after the connecting elements, or element, have been broken by a plunger or, in general, by a pressing element, the closing member is at least in part detached from the outlet wall and are moved into the capsule to open the outlet portion of the outlet wall and dispense a beverage. In order to break the connecting elements and detach the closing member from the inner side of the outlet wall, and to thus open the capsule, pressure is applied to the closing member, usually pressure directed to the inside of the capsule.

The closing member is located on the inner side of the outlet wall and is extending from it into the capsule; in the outlet wall, in correspondence to the location of the closing member, is provided an outlet portion, i.e. an opening, of the outlet wall. Preferably said opening is in the form of a missing portion of the bottom wall, i.e. a hole through the outlet wall, such that without the presence of the closing member, the outlet portion provides a passage from the interior of the capsule to the outside.

As mentioned, the closing member extends at least in part from the inner face of the outlet wall and is integral, preferably in one piece, to the outlet wall to provide a sealing of the outlet portion and thus a normally closed outlet wall, i.e. a closed capsule, before the capsule is used. In an embodiment, the closing member is prepared separately from the capsule and is made integral to the outlet wall in any known way, such as by gluing, welding and similar methods, so as to close the outlet portion. The closing member may be a foil or membrane; the closing member may be made temporarily integral to the outlet wall, e.g. by using a glue or a connecting element that releases the closing member when hot water is fed to the capsule in the brewing step.

In an embodiment, when the capsule is in a closed condition, said at least part of the outer face of the closing member is lying in a plane defined by the inner side (or inner face) of the outlet wall. In other words, in this embodiment, when the capsule is closed the outer face of the closing member is substantially co-planar with the inner face of the outlet wall, at least in the area where the closing member is integral with the outlet wall and in an area adjacent to it.

The outer surface of the closing member may also be positioned inside or outside with respect of the inner face of the outlet wall of the capsule. In other words it may protrude or be recessed with respect to the neighbouring part of the outlet wall, and such protrusion or recess can be considered either with respect to either the inner or the outer face of the outlet wall; in general, if the projecting portion is partially housed in the housing, the amount of portion housed in the housing, measured in a cross section of the outlet, is 35% or less, of the thickness of the projecting portion, preferably 15% or less, more preferably less than 10% of said thickness.

As mentioned, the capsule's closing member is integral to said outlet wall through a breakable element connecting the closing member with the outlet wall; in an embodiment, said connecting element is located internally to then outlet wall of the capsule and it extends from the outer face of the sealing element to said outlet wall along at least part of the periphery of said outer face. In an embodiment, the entire periphery of the closing member has a connecting member and the entire closing member can be detached from the outlet wall upon breaking the connecting element.

In an embodiment, the closing portion is shaped, e.g. U-shaped, so that the central part of the closing member extends through the outlet portion of the outlet wall and it extends outside the outlet wall with a preferably flat surface. When the capsule is in a closed condition, the externally protruding surface of the central portion of the closing member may be spaced from the outer face of the outlet wall. In this embodiment, by applying a pressure on the protruding surface of the closing member the connecting element will break and the capsule is opened.

In another embodiment, the closing member has a flat area located substantially co-planar with the inner face of the outlet wall and the pressure is applied to said flat area. The flat area may extend throughout the closing member or only for part of it; in the latter case the closing member can have a combination of a flat circular ring along the periphery of the opening and a centrally located portion protruding from the outlet wall.

In another embodiment, the closing member is a membrane or a foil attached to the outlet wall to cover and close the outlet portion (the opening) of the outlet wall; exemplary foil are Aluminum base foils, such as Aluminum laminates. In general, laminated foils composed at least in part by laminated aluminum, or including aluminium-coated laminated plastics, or laminated plastics in different combinations of layers of materials readily available to the skilled in the art such as PP, EVOH, PE etc., or biodegradable laminated materials, can be used. Suitable ways to attach the foil to the capsule include welding and gluing the foil to the inner side of the wall. In an embodiment, the capsule is opened by a plunger that acts on the closing member; the plunger preferably has a shape complementary to the shape of the outlet portion in the outlet wall. The plunger can therefore penetrate in the outlet portion of the outlet wall and break the connecting element. In a condition of the capsule before both before and after the step of breaking the connecting element, the plunger is partially housed in the outlet portion of the outlet wall and closes the opening of the outlet portion in the outlet wall.

As mentioned, a housing may be provided by the outlet portion of the outlet wall for the plunger when the capsule is opened; in an embodiment, the housing has a shape that is complementary to the shape of the plunger, a preferred shape is a circular shape of both plunger and housing. Thus, in an open condition of the capsule, the plunger is located in the outlet portion and may provide a passage between the lateral walls of the outlet portion and the lateral wall(s) of the plunger. The passage for the beverage may be present after the opening of the capsule or may be formed when the beverage exits from the capsule; in an embodiment, a passage is present as a result of breaking the connection element, then the plunger closes again the outlet portion and a passage is formed again by the beverage exiting the capsule under pressure. A disclosure of the interaction between plunger and outlet wall is provided in above mentioned EP1370170; the dimension, namely the diameter, of the plunger may be slightly less, equal or slightly greater than the dimension, namely the diameter, of the outlet portion. In general, the difference between the two diameters is such that if the diameter of the outlet portion is greater than the diameter of the plunger, the difference is 0.2 mm or less, i.e. the gap between plunger and opening is 0.1 mm or less. If the diameter of the outlet portion is smaller than the diameter of the plunger, according to possible embodiments, the difference is not greater than 0.5 mm, i.e. the interference between the plunger and opening is not greater than 0.25 mm.

In an embodiment, the plunger and the opening portion have the same shape, e.g. circular, and the dimension of the plunger are greater than those of the opening portion, so that when the plunger is inserted in the opening portion it adheres to the sides of the opening portion of the outlet wall. The result of opening the capsule by breaking the element which is connecting the projecting portion to the outlet wall and by pressing the plunger into the outlet portion of the outlet wall, is that the plunger closes the opening both before and after it has detached the closing member from the outlet wall of the capsule. When the beverage exits the capsule, the beverage flows through a passage between the walls of the housing and the walls of the plunger housed in the outlet portion, the passage is obtained by the action of the pressurized beverage inside the capsule.

Another object of the invention is a method of dispensing a beverage.

The method comprises the steps of: providing a capsule having an outlet wall, an outlet portion located in said outlet wall and a closing member of said opening of the outlet wall, wherein said closing member is integral with said outlet wall and extends inside the capsule from said outlet wall in correspondence to said outlet portion; pressing said closing member; opening the capsule by detaching at least in part said closing member from the outlet wall; providing at least one passage between inside and outside the capsule; dispensing a beverage through said passage. The required pressure on the closing member may be exerted by any means known in the field. As an example, the said means may be a part of a seat in a beverage collector element that receives the capsule in a known brewing machine: when the capsule is received in its seat and the machine is closed to start the brewing step, the closing pressure can also be used to break open the connecting element of the closing member. In a preferred embodiment, the capsule of the invention is provided with a conveyor cap having a plunger, as discussed in above mentioned PCT/EP2016/057844. In this embodiment the closing member of the capsule is/are pressed into the capsule when the conveyor cap is axially moved closer to the outlet wall of the capsule: at this time the capsule may be mechanically opened.

Thus, the invention relates also to a system comprising a capsule and a collector element for the beverage. Preferably the collector element for a beverage is a conveyor cap as disclosed in the application.

It should be understood that in an embodiment where the collector element for the beverage is part of a beverage preparing machine, the features of the plunger which are hereinafter disclosed for the conveyor cap are present, mutatis mutandis, in the plunger of the beverage collector element.

In another embodiment, the closing member (either integral part of the outlet wall or foil sealingly attached to the outlet wall) is mechanically biased by a force directed to the interior of the capsule but it does not break open the capsule, i.e. the connecting element is stressed (i.e. biased) by the plunger but it is not ruptured by the action of the plunger. Opening occurs after pressurized water, or equivalent fluid, is fed into the capsule to brew or dissolve the ingredients. In other words, the opening is obtained by a combination of mechanical force and internal pressure acting on the capsule walls.

It is possible to regulate the minimum distance from the outlet wall of the capsule that is reachable by the abutment elements of the conveyor cap so as to control the mechanical pressure exerted on the closing member by the plunger of the conveyor. When the closing member is a foil or equivalent element attached to the outlet wall to close its outlet portion, the plunger may break or detach the foil. The foil may be detached if the foil is attached to the inner side of the outlet portion by a connecting element that can break or dissolve during the beverage preparation process. Suitable connecting elements of this type are e.g. glues that are dissolved or that lose their adhesive properties when contacted by hot water. In such a case the closing member will detach from the outlet wall without breaking or lacerating.

This process allows to regulate, amongst other variables, the opening pressure of the capsule and the so-called "time to brew" or length of the initial period of time during which the drink is held within the capsule, thus allowing to provide—if needed—different infusion parameters which, in return, allow for modulating the organoleptic profile of the drink. Moreover, with the method of the present invention the flow rate of the beverage dispensed from the capsule can be controlled by controlling, e.g. with a suitable design, the shape and/or dimensions of outlet portion and plunger.

This will result in having different types of passages for the beverage, e.g. passages always present (useful for beverages without cream or bubbles) and passages that are present only when the pressure in the capsule is high enough (as above discussed) during the dispensing step.

The walls of the outlet portion and/or the side walls of the plunger may have recesses or ribs to increase or decrease the dimensions of the passage or to partition the passage into several passages.

In a preferred embodiment, the size, e.g. the diameter, of the plunger is equal to or greater than the size of opening portion; thus, the plunger closes the outlet portion of the outlet wall before and/or after the closing member is detached from the outlet wall. In other words, in an embodiment of the invention a portion of the plunger has a diameter big enough to engage the outlet portion of the outlet wall when the plunger is inserted in the outlet portion and contacts the closing member. The result is that even after the closing member has been detached or broken, the capsule is still a closed capsule because the plunger closes the outlet portion: the required passage or passages between plunger and outlet wall are at least in part obtained when water is fed into the capsule to prepare a beverage; once the pressure in the capsule has reached a value sufficient to force water (or similar fluid) to pass between plunger and outlet wall. Further details of this embodiment may be found in above discussed EP1370170.

In a preferred embodiment the following features are present in combination: the capsule is provided with a conveyor cap which can move in respect to the central vertical axis of the capsule, the conveyor cap has a plunger, when the capsule-and-conveyor system is housed in a brewing machine, as soon as the machine's brewing chamber is closed and ready for brewing the conveyor cap is moved against the outlet wall of the capsule, the height of the plunger is such that, when the machine is closed and prior to feeding water to the capsule, the plunger exerts on the closing member of the outlet wall a mechanical force directed to the inside of the capsule. The width dimension of the plunger (e.g. the diameter) are equal or greater than the same dimensions of the opening element of the outlet wall, the opening of the outlet wall the beverage is obtained by detaching the internally located closing member, the closing member detaches upon combined action of a mechanical force applied by the plunger and the force applied by the pressure of the fluid fed inside the capsule.

In another embodiment, the combination of features is the same except for the fact that the height of the plunger is such as to be positioned close or in contact to the closing member of the outlet wall, without exerting a mechanical force directed to the inside of the capsule, The invention provides several advantages over the prior art. The capsule is opened in an easy and reliable way, it is not expensive to produce and provides means to adjust the flow rate of the beverage dispensed from the capsule in view of the type of beverage required. In other words, by defining different interface surfaces between the outlet wall and the opening means different preparation cycles, bearing different pressure curves, that is different pressure build-up in time, may be achieved and subsequently different drink preparations may be obtained. As an example, in a capsule for dispensing espresso coffee the resistance through the passage between housing and projecting portions will be greater than in a capsule for dispensing hot broth. The invention capsule is particularly suitable to be used with a conveyor cap as disclosed in applicant's application PCT/EP2016/057844, mutatis mutandis.

BRIEF DESCRIPTION OF THE DRAWINGS

The invention will now be disclosed in greater details with reference to the non limiting drawings, in which.

DESCRIPTION OF THE INVENTION

Figure 1:
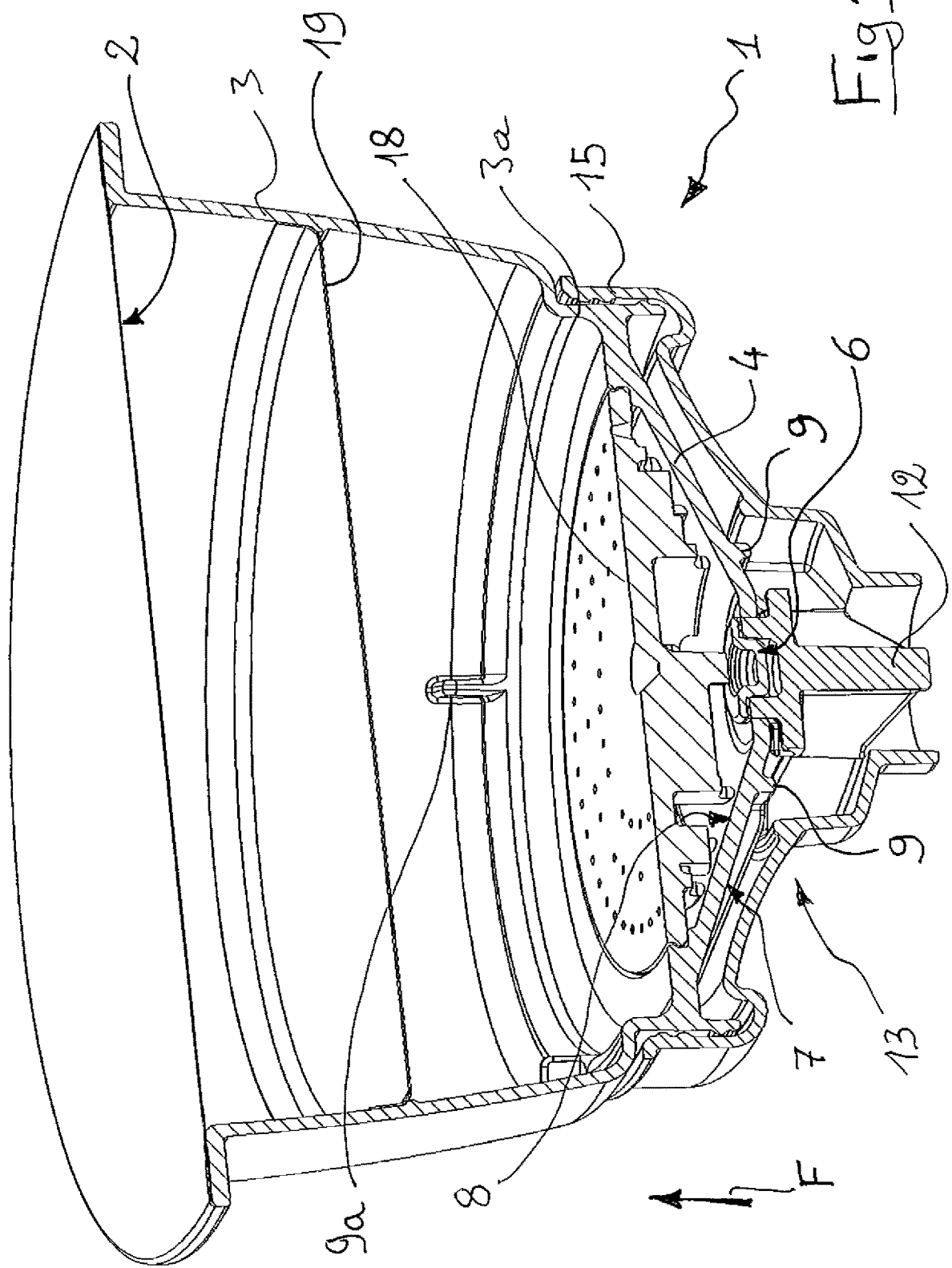
FIG. 1 is a perspective sectional view of the assembled capsule of the invention.
Figure 2:
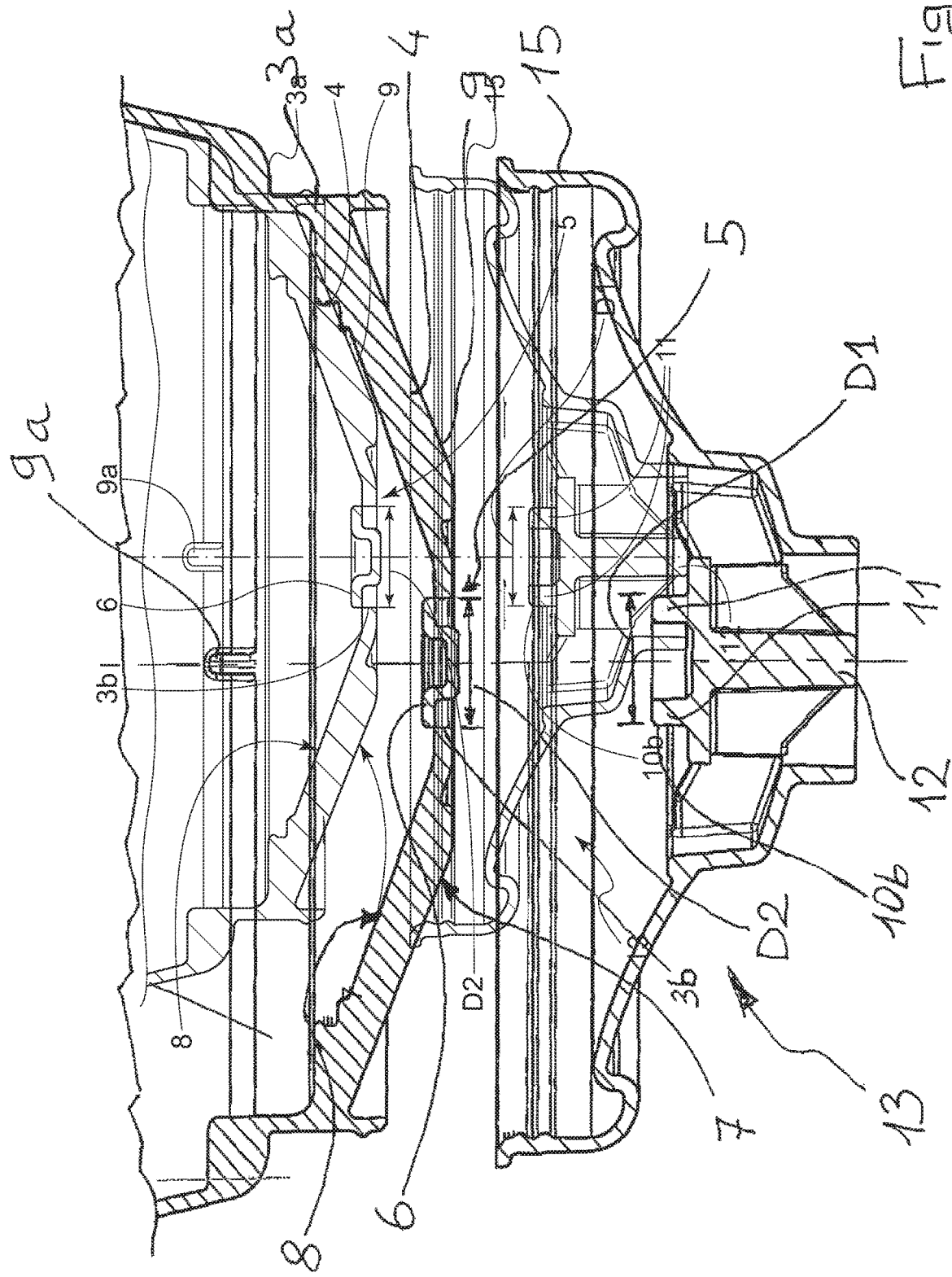
FIG. 2 is a partial lateral sectional view of a capsule of FIG. 1.

With reference to FIGS. 1 and 2, the capsule 1 of the invention has an inlet wall 2, through which water or a fluid is injected or fed to the capsule 1; the inlet wall shown in FIG. 1 is a membrane, known per se in the art, that is suitable to be pierced by an injecting means for fluid or water. Other possible inlet walls, known per se in the art, may be used, such as the self-piercing inlet wall disclosed in EP1807318. Capsule 1 also has a lateral wall 3 and an outlet wall 4 where outlet means are located for dispensing the beverage prepared in the capsule; the capsule acts as a brewing chamber. Outlet wall 4 has an inner side 8 and an outer side 7; in the shown embodiment, the outer side is provided with ribs 9 to increase the rigidity of the wall, small ribs 9a may connect the outlet wall to the lateral wall 3 also for increasing the rigidity of the capsule. A filter support 18 is located at the bottom portion of the capsule and secured in said position for instance by ultra-sound welding/bonding, or simply by a mechanical interference between the filter and the body, apt to provide for example a click-on (or snap fit) insertion. Additionally a paper filter disk (not shown in the drawings) may be welded on the annular ring immediately next to the filter support 18, in order to secure the filter support 18 and avoid the delivery of the thinnest coffee fines into the finished beverage. Optionally a further filter or perforated element 19 is welded to the side wall 3 above the filter support 18; element 19 is spaced from the filter support 18 to provide a chamber for housing coffee or other ingredient for preparing the required beverage.

The area of the outlet wall 4 through which the beverage is dispensed from the capsule (which is shown, enlarged, in FIGS. 5 and 6) comprise at least one outlet portion 5 provided in outlet wall 4 and a closing member 6 for the outlet portion 5. Outlet portion 5 is preferably a through-hole in the outlet wall, so that an empty space is present in outlet wall 4 at the position where the closing member 6 is located. The preferred embodiment shown in the figures has one centrally located outlet portion, other possible embodiments may have more than one opening.

To the outlet portion 5 is associated a closing member 6 which is integral in one piece or made integral with the outlet wall 4 and closes the opening 5. In an embodiment, the outlet portion is a circular hole in the wall 4, the closing portion is a circular element closing the hole 4 and located inside the capsule, on the inner side of wall 4.

Figure 6:
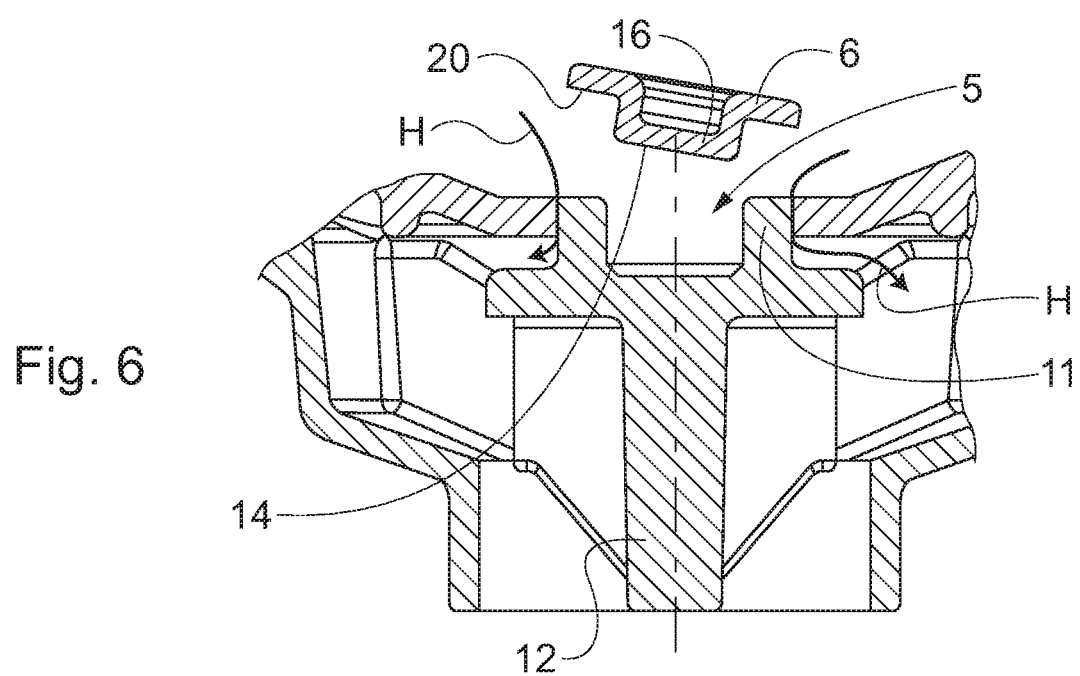
FIG. 6 is a view of the detail of FIG. 5, in an opened condition of the capsule.
Figure 7:
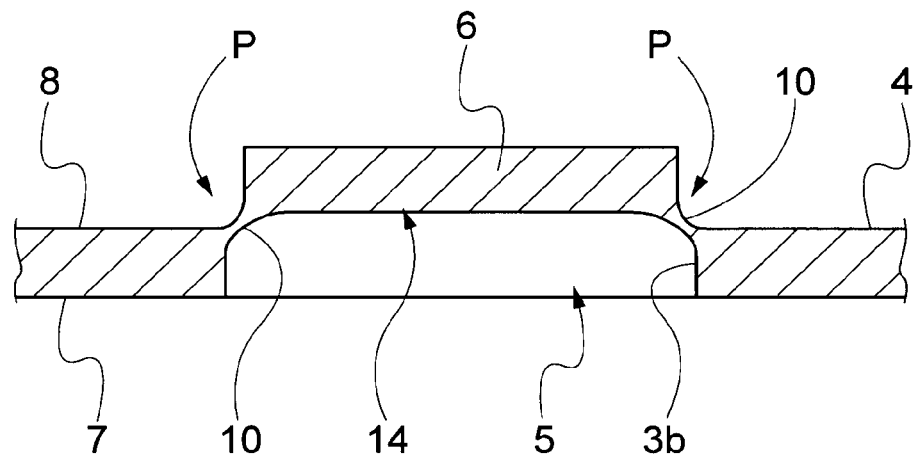
FIG. 7 is an enlarged sectional view of the area of the outlet wall comprising the outlet portion

In an embodiment, the capsule's closing member 6 is integral to outlet wall 4 by means of a breakable connecting element 10, see FIG. 7, which is connecting the closing member 6 with the outlet wall 4; in an embodiment, the connecting element is located along the periphery P of the outer face 14 of the closing member. In other embodiments, element 10 may be located internally or externally to the capsule depending on the position of the closing member with respect to the thickness of the outlet portion. In FIG. 7 the connecting element 10 is shown to extend along the entire periphery of outer face 14 of member 6 from the edge of the outer face of member 6 to the edge of the periphery of the outlet portion 5. The closing element of FIG. 7 is flat, although other shapes are possible, such as the U-shape of closing member 6 shown in FIGS. 1-6.

It should be noticed that in most of the embodiments of the invention, connection element 10 has low thickness and dimensions, which may be in an exemplary range of 0.02 to 0.1 mm. Thickness and dimensions may be different according to the type of material used and preferably connecting element 10 has a substantially homogeneous thickness connecting it to outer wall 4. In a capsule which injection molded or co-injection molded, the injection point is preferably located in the closing member.

In the previously disclosed embodiment of the invention the width of the closing member 6 is substantially identical to the width of the outlet portion 5 of outlet wall 4. This will result in the above discussed location of connection element 10, along the periphery of both portion 5 and member 6. Other possible embodiments may provide for the width of member 6 to be shorter than the width of the housing 5 at outer side 7 of wall 4. In this embodiment connection element 10 will extend to provide the required link between member 6 and wall 4.

Figure 5:
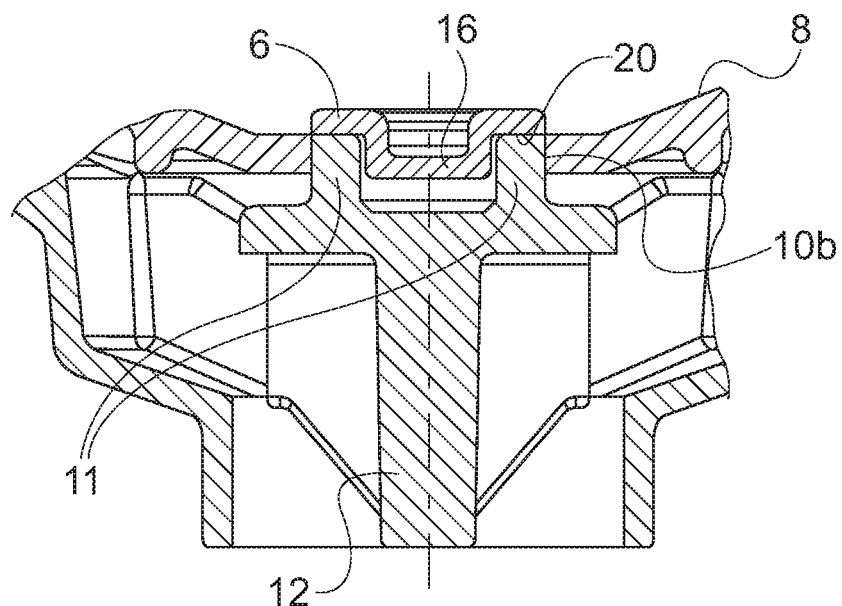
FIG. 5 is a lateral sectional and enlarged view of a detail of the capsule of FIG. 1.

To open the capsule, pressure is applied on the closing member 6, connection element 10 is broken, i.e. ruptured (see FIG. 6), and the closing member is pushed towards the inside of the capsule and is housed therein during the beverage preparation steps. The pressure may be applied by a pressing device which is here referred to as a plunger 12, however any suitable form or shape of a pressing device bearing different heights and sharp or smoothened corners may be used. The uppermost part of plunger 12, the area pressing against closing member 6, may be designed to remain, when the brewing cycle is on, substantially in contact and planar with respect to the inner face of the outlet wall 4, as shown in FIG. 5 and FIG. 6 or—preferably—it can be slightly higher, so that it will protrude from the inner face of outlet wall.

FIGS. 1 and 2 show a sectional view and an exploded view, respectively of a capsule according to the invention and a conveyor cap, in which the capsule is in a closed condition, i.e. the outlet portion 5 is closed by the closing member 6. In the assembly, lateral wall 15 of conveyor 13 is located outside the bottom (with respect to the figure) portion 3a (see also FIG. 2) of lateral wall 3 of the capsule The conveyor 13 can slide along lateral wall 3a as shown by arrow F, to press closing member 6 into the capsule after having ruptured connection element 10. The conveyor has a plunger 12 (or equivalent means apt at controlling the amount of liquid per second to pass through the opening(s) created to let the beverage flow out of the capsule) that acts on closing member 6 to open the bottom wall of the capsule. In an embodiment, the capsule is opened by plunger 10 that acts on the closing member; the plunger has a shape complementary to the shape of the outlet portion 5 in the outlet wall 3, as visible in the figures. The plunger can therefore penetrate in the outlet portion 5 of the outlet wall (as shown in FIGS. 1 and 5) and break the connecting element 10 to detach the closing member 6. In the opened condition of the capsule, shown in FIG. 6, a portion of plunger 12 is housed in the outlet portion 5 of the outlet wall of the capsule.

The result of opening the capsule by breaking the element 10, which is connecting the closing member to the outlet wall and by pressing the plunger into the outlet portion 5 of the outlet wall 3, is that the outlet wall is no longer intact and that when the beverage exits the capsule, the beverage flows through a passage between the wall 3b of the outlet portion 5 and the wall 10b (see FIG. 7) of the plunger housed in the outlet portion, as shown by arrows H in FIG. 6. By selecting the dimensions and shape of plunger and of the opening 5 it is possible to control the flow of the beverage that is dispensed from the capsule.

In the embodiment shown in the figures, the outlet portion 5 has a shape that is complementary to the shape of the plunger, namely they both have a circular shape. Thus, in an open condition of the capsule, the plunger is located in the outlet portion 5 and provides a passage between the lateral wall 3b (of the wall 3) of the outlet portion and the lateral wall 10b of the plunger 12. It is shown in FIGS. 1 and 5 that the plunger may fit into outlet portion 5 also before the wall has been opened. The plunger 12 has a diameter D1, the outlet portion 5 has a diameter D2, as shown in FIG. 2; in a preferred embodiment D1 is substantially greater or equal to D2, i.e. D1≥D2. In the shown embodiment the diameter D1 of the portion 11 of the plunger 12 is equal or greater than D2; the ratio of the diameters is such that portion 11 of plunger 12 can enter into opening, i.e. outlet portion, 5 and fits into said opening in a way to substantially close the opening. In an embodiment D1 fits in opening 5 so as to generate an interference fit, because of the greater diameter D1 of the portion 11 of the plunger with respect to diameter D2 of outlet portion 5. In other words, wall 10b of the plunger will be in contact with wall 3b of the outlet portion 5, preferably exerting a pressure on wall 3b.

Figure 3:
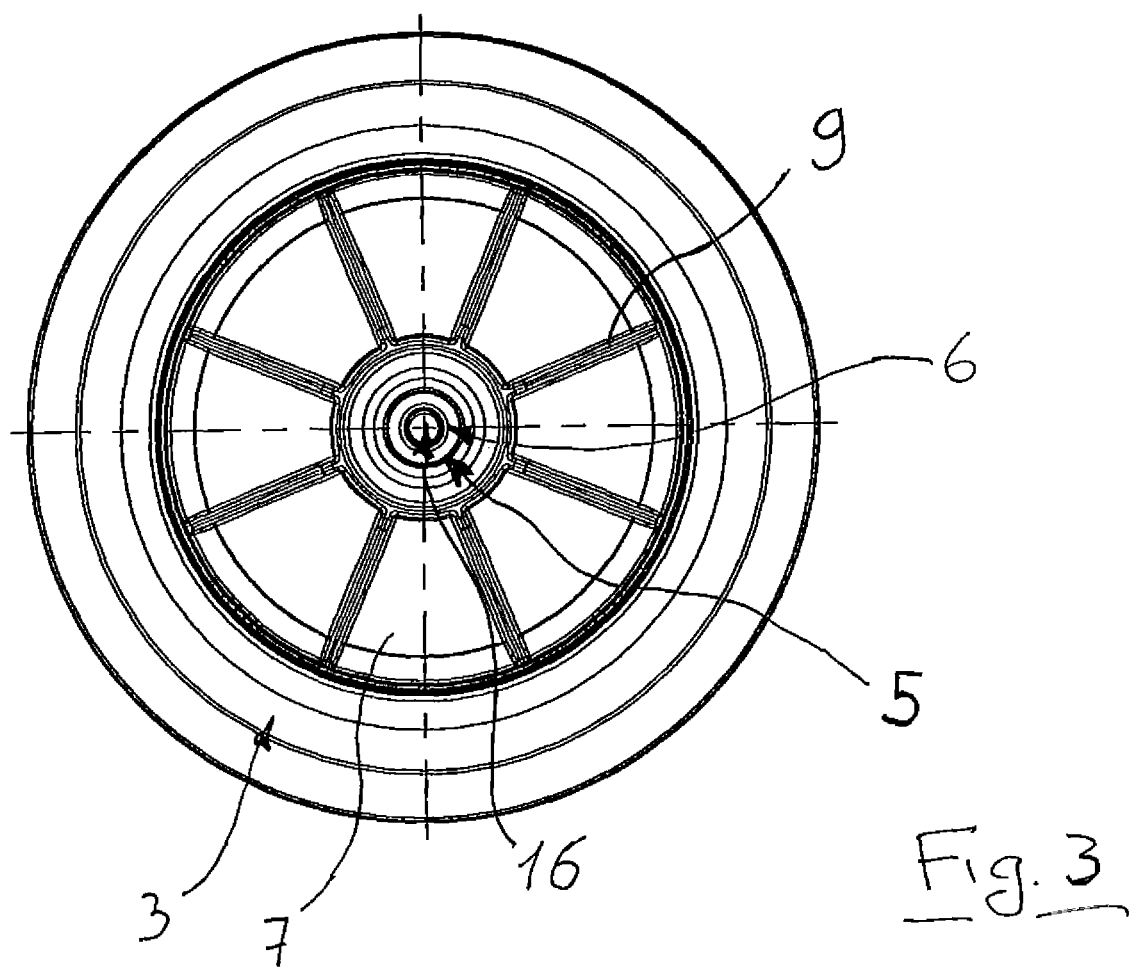
FIG. 3 is a top external view of the outlet wall of the capsule of FIG. 1.
Figure 4:
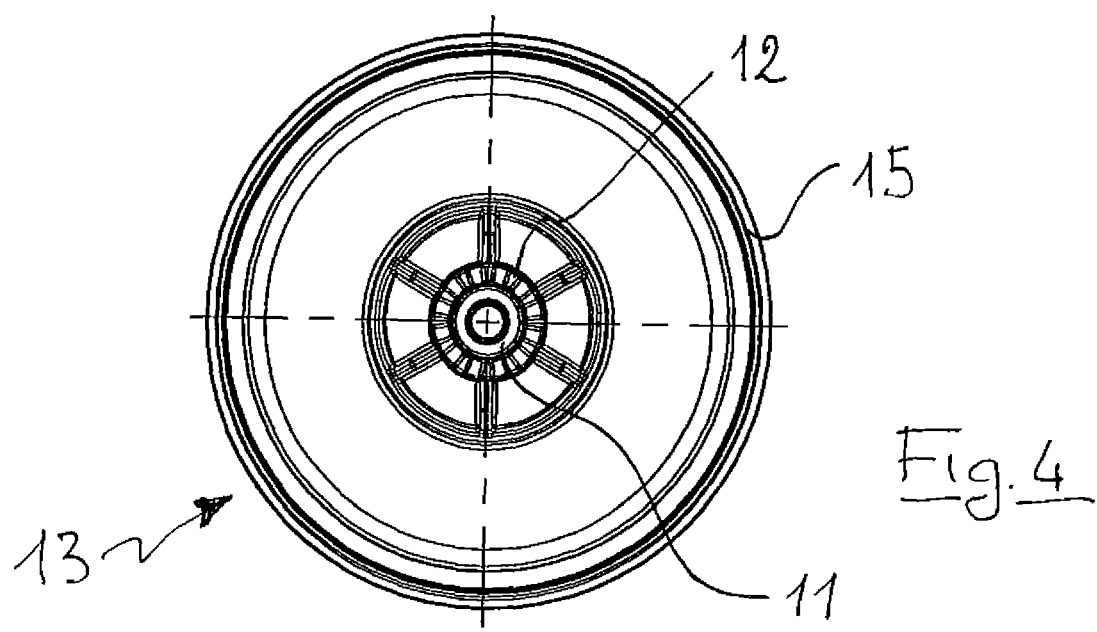
FIG. 4 is a top internal view of a conveyor cap for the capsule of FIG. 1.

The passage may be present after the opening of the capsule or may be formed when the beverage exit from the capsule; in the shown embodiment, the plunger closes the outlet portion before it detaches the closing member from the outlet wall (see FIGS. 3 and 4). In this embodiment, a passage is formed by the beverage exiting the capsule under the force exerted by the pressure built in the capsule upon feeding pressurized water to the capsule. In other words, the opening 5 is closed by the plunger after member 6 has been detached from the outlet wall, because of the interference fit of portion 11 of the plunger with opening 5. Once the pressure in the capsule has reached a value sufficient to force the beverage between wall 10b of portion 11 of the plunger and wall 3b of opening 5 of outlet wall 3 (see arrows H of FIG. 6), the beverage will be dispensed. Advantageously, the interference fit ensures that the opening 5 is closed or substantially closed after the beverage has been dispensed so as to avoid or reduce dripping of the beverage when the capsule is removed from the machine. In general, the ratio D1/D2 may be in the range of 1.0 to 1.08. In preferred embodiments, the difference D1−D2 is 0.2 mm or less, i.e. the plunger is bigger than the outlet opening and the dimension of the plunger diameter D1 and of the outlet diameter D2 are selected so that D1−D2=0.2 mm or less. In possible embodiments the difference D1−D2 may be −0.5 or less, preferably −0.2 mm or less, i.e. the plunger is smaller than the outlet opening. Suitable dimension of the plunger diameter D1 can be comprised between 8 mm and 4 mm, preferably between 6 mm and 5 mm. A further explanation of the interaction between a plunger and an outlet wall by interference fitting is disclosed in above mentioned EP1370170.

The method for dispensing a beverage with the use of a capsule as above discussed comprises initially the step of providing a capsule 1 having an outlet wall 4, an outlet portion 5 located in said outlet wall and a closing member 6 for said outlet portion 5 wherein said closing member is integral or made integral with said outlet wall 4 through a connecting element 10 of the capsule, said closing member 6 may be located on the inner side of the outlet wall and extends into the interior of said capsule. To open the capsule a plunger or equivalent means is provided and is contacted with the closing member 6 through outlet portion 5 of the outlet wall. The plunger is preferably provided as a part of a conveyor cap that is mounted on the capsule so as to enclose outlet wall 4.

In an embodiment, top portion 11 of the plunger is pressed against the closing member 6 to break connecting element 10 and open the capsule wall. In another embodiment of the invention, portion 11 of the plunger is initially brought into contact with the closing member 6 through said outlet portion 5; the plunger is pressed against said closing member, to detach said closing member 6 and provide at least one passage between housing and projecting portion; a beverage is dispensed through said passage. When the capsule is to be opened the projecting portion 5 is subjected to a force directed towards the inside of capsule 1, the connection element 10 is broken and portion 5 is moved inside the said housing, to provide at least one passage between housing 6 and projecting portion 5; the final step is dispensing a beverage through said passage.

In another embodiment, portion 11 of the plunger is inserted in outlet portion 5, is initially brought into contact with the closing element 6 and is pressed against it with a force that is sufficient to bias the closing element 6 towards the interior of the capsule, but that is not sufficient to break the connecting element 10. In other words, the method provides for a first step where a force is exerted against closing member 6 while said capsule is closed, without opening the capsule. Then, pressurized water or pressurized brewing fluid is fed to the inside of the capsule to prepare the required beverage; by feeding the pressurized fluid, e.g. water, the pressure inside the capsule will increase, e.g. to the required brewing pressure, if the beverage is brewed, or to the required mixing pressure if the beverage is prepared by mixing, for instance, a soluble ingredient or a liquid concentrate through pressure. The pressure increases until the combined action of the force exerted by the plunger 12 and the force exerted by the pressurized liquid in the capsule result in said closing member 6 being detached from the inner face 8 of the outlet wall 4 and a beverage is dispensed.

As previously mentioned, the plunger is preferably providing an interference fit with the opening 5 and the required passage or passages for the beverage is generated, too, by the pressure in the capsule, which will force the beverage between walls 3b and 10b, as above discussed.

In the embodiment shown in FIGS. 1-6, the closing portion 6 is shaped, namely it is U-shaped, so that the central part 16 of the closing member 6 extends through the outlet portion 5 of the outlet wall and projects outside the outlet wall 4 with a flat surface of the outer side 14 of member 6. When the capsule is in a closed condition, the externally protruding surface of the central portion 16 of the closing member may be spaced from the outer face 7 of the outlet wall 4. In this embodiment, by applying a pressure on the protruding surface 16 of the closing member 6 the connecting element will break and the capsule is opened.

In the shown embodiment, closing member 6 has a flat area 20 located substantially co-planar with the inner face 8 of the outlet wall and the pressure is applied to said flat area. The flat area 20 may extend throughout the closing member, as shown for the embodiment of FIG. 7, or only for part of it, as in FIGS. 1-6; in the latter case the closing member 6 can have a combination of a flat circular ring 20 along the periphery of the opening and a centrally located portion 16 protruding from the outlet wall. The pressing portion 11 of the plunger 12 will be shaped to conform to the shape of closing member 6. Preferably, in a brewing and/or dispensing condition of the capsule, the plunger will protrude from the inner side of outlet wall 4; this feature preferably applies to all embodiments here disclosed.

Figure 8:
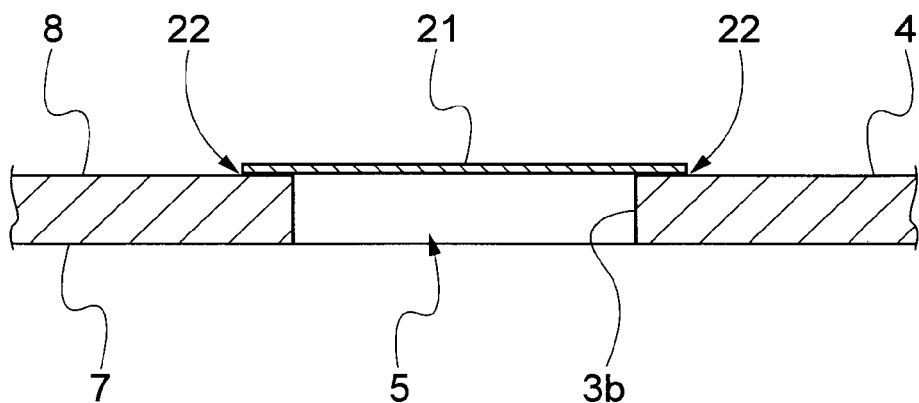
FIG. 8 is an enlarged view similar to FIG. 7, of a further embodiment of the invention.

Another embodiment of the capsule of the invention has a closing member which is foil 21 or membrane that is glued or welded (see FIG. 8) to the inner side of the outlet port. In the case of a welded closing member, the above description of the capsule and conveyor (or beverage collector) will apply with the proviso that the closing member is not detached from the outlet wall but rather it is lacerated or broken by the plunger. In an embodiment the foil 21 is broken or lacerated to provide the required opening of the capsule when the plunger is inserted into the opening.

In an embodiment, the foil or membrane 21 is attached to the outlet wall in a way that it normally seals the outlet portion and that it may be removed, i.e. detached, from the wall by the plunger when the beverage is being prepared. This is e.g. the case where the foil 21 is attached to the outlet wall 4 by removable (i.e. detachable) means such as a removable glue 22, or a glue 22 melting at a temperature compatible with the ones in the capsule during dispensing of a hot drink. The glue will lose its adhesive properties upon contact with the hot water which is being fed to the capsule and, because the plunger 12 is biasing the closing member towards inside the capsule the foil 21 will detach, usually without lacerating or breaking, to free the outlet portion.

As above mentioned, the dimensions of plunger and outlet portion of the outlet wall are preferably selected so that the plunger will close the outlet portion upon being inserted into it to break the foil 21 or to detach it from the outlet wall 4. The above features and aspects of the invention discussed with reference to the embodiment having an integral closing member and a connecting portion of the member to the capsule outlet wall, apply mutatis mutandis to the here discussed embodiment.

The invention claimed is:

1. A capsule (1) for a beverage dispensing apparatus, said capsule having an outlet wall (4) through which beverage is dispensed from the capsule (1), said outlet wall having an outer side (7) and an inner side (8) and being provided with at least one outlet portion (5) and a closing member (6) for said outlet portion of the outlet wall, said closing member is integral or made integral to said outlet wall (4) through a connecting element (10) of the capsule, said closing member (6) is located on the inner side of the outlet wall and extends into an interior of said capsule, further comprising a conveyor cap mounted on at least the outlet wall of said capsule (1), said conveyor cap having a plunger (12), wherein said closing member of the outlet portion (5) and said plunger of the conveyor cap are configured and positioned to interact so that the capsule is opened by the plunger due to a relative movement between the capsule (1) and the conveyor cap (13), whereby the plunger breaks or detaches at least part of said closing member from the inner side of the outlet wall of the capsule.

2. The capsule according to claim 1, wherein said connecting element is extending at least from an outer face (14) of the closing member (5) to the inner side (8) of said outlet wall (4) along at least part of the periphery of said outer face (14) of the closing member and said connecting element (10) is broken to open the capsule.

3. The capsule according to claim 1, wherein said connecting element is a glue (22) and said closing member is a foil (21) glued to said outlet wall.

4. The capsule according to claim 1, wherein the shape of the plunger is complementary to the shape of the outlet portion.

5. The capsule according to claim 1, wherein the plunger and the outlet portion have circular shape.

6. The capsule according to claim 5, wherein the diameter of said plunger is equal or greater than the diameter of the outlet portion.

7. The capsule according to claim 6, wherein the closing member and the plunger have a "U" shaped longitudinal section and the closing member has a circular flange-like portion (17) to receive the plunger.

8. The capsule according to claim 1, wherein the closing member comprises a portion (16) extending from the inner wall of the outlet wall of the capsule, through the outlet portion of the outlet wall to a position even with or protruding from the outer side (7) of the outlet wall.

* * * * *